(12) United States Patent  (10) Patent No.: US 7,858,923 B2
Uduki                     (45) Date of Patent:    Dec. 28, 2010

(54) LIGHT BEAM SCANNING APPARATUS AND IMAGE FORMING APPARATUS PROVIDED WITH THE SAME

(75) Inventor: Kazuo Uduki, Abiko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/960,197

(22) Filed: Dec. 19, 2007

(65) Prior Publication Data

US 2008/0173801 A1    Jul. 24, 2008

(30) Foreign Application Priority Data

Dec. 26, 2006  (JP) ............................. 2006-350149
Dec. 18, 2007  (JP) ............................. 2007-325452

(51) Int. Cl.
H01J 3/14  (2006.01)
(52) U.S. Cl. ........................................ 250/234; 250/236
(58) Field of Classification Search ................ 250/230, 250/566, 225, 226, 559.49, 216, 570, 235, 250/234, 236; 347/224, 225, 247–250, 252–254, 347/233, 129, 132; 359/201, 218, 215, 305, 359/315, 216.1, 217.1; 358/481, 1.17, 302, 358/300, 296, 451
See application file for complete search history.

(56) References Cited

U.S. PATENT DOCUMENTS 3,736,046 A * 5/1973 Zook ........................... 365/121
3,809,806 A * 5/1974 Walker et al. ................. 347/260
4,378,562 A * 3/1983 Oosaka et al. ................ 347/260
4,386,827 A * 6/1983 Scifres et al. ................. 359/315
5,363,126 A * 11/1994 Andrews ...................... 347/134
5,541,761 A * 7/1996 Shibaguchi ................ 359/216.1

FOREIGN PATENT DOCUMENTS

JP      09-169136 A    6/1997
JP      2002-116395 A  4/2002

* cited by examiner

Primary Examiner—Que T Le
Assistant Examiner—Jennifer Bennett
(74) Attorney, Agent, or Firm—Rossi, Kimms & McDowell LLP

(57) ABSTRACT

A light beam scanning apparatus capable of forming a high contrast electrostatic latent image. A polygon mirror scans a light flux emitted from a light source in a main scanning direction. An electrostatic latent image in an irradiation position irradiated by the scanned light flux is formed onto a photosensitive drum. An electro-optic crystal structure disposed in a light path between the light source and the polygon mirror deflects a course of the light flux emitted from the light source to the main scanning direction by applying a voltage. A controller maintains the irradiation position on the photosensitive drum irradiated by the light flux, by controlling a voltage to be applied to the electro-optic crystal structure according to the scanning information during the time period in which an electrostatic latent image corresponding to one dot is formed on the photosensitive drum.

12 Claims, 9 Drawing Sheets

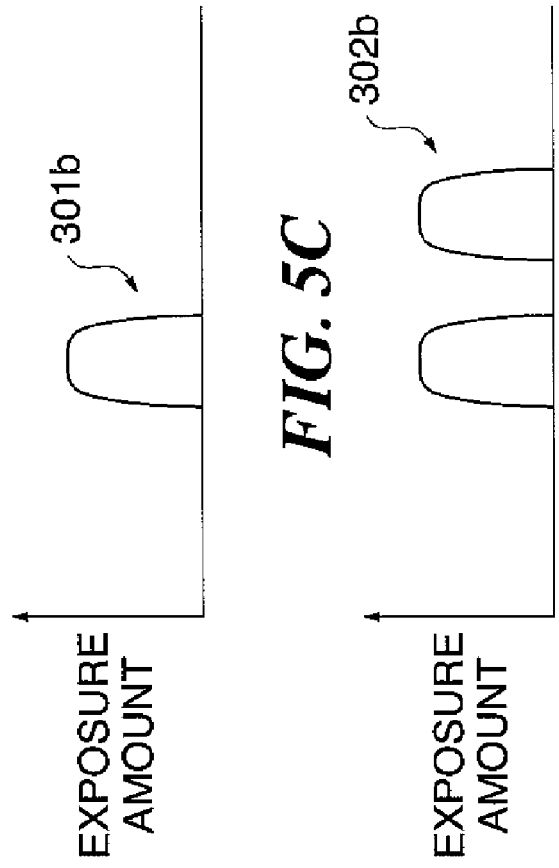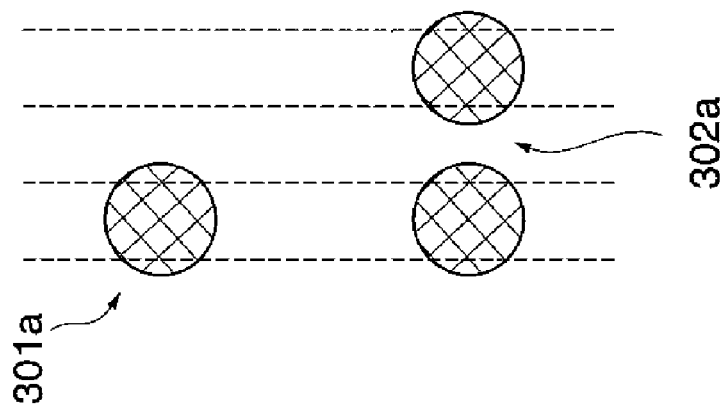

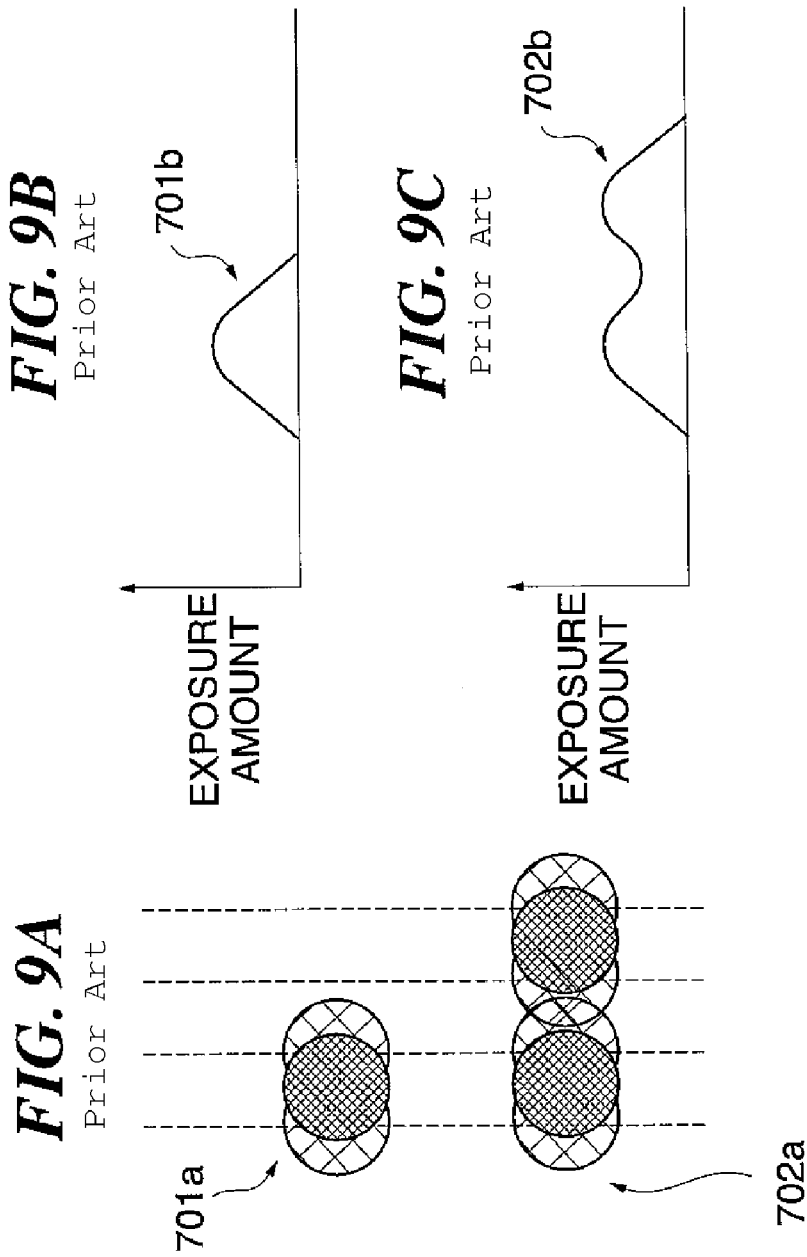

LIGHT BEAM SCANNING APPARATUS AND IMAGE FORMING APPARATUS PROVIDED WITH THE SAME

BACKGROUND OF THE INVENTION

1. Field of the Invention

The present invention relates to a light beam scanning apparatus which is mounted to an image forming apparatus such as a copy machine or a laser beam printer, and an image forming apparatus provided with the same.

2. Description of the Related Art

Conventionally, in an electrographic image forming apparatus, generally, a semiconductor laser is driven to emit a laser beam, and the laser beam is deflected at a rotating multi-faceted mirror (polygon mirror) rotated by a scanner motor so as to scan and irradiates the scanned beam onto a photosensitive member based on input image data. In this way, a latent image is formed, which is developed to a toner image to be transferred onto a storage medium to form an image.

Recently, such image forming apparatuses have been developed to correspond to the advancement in the fields of printing and desktop publishing, and the image quality, especially the reproduction of high definition letters, line drawing images, and halftone, required in the fields cannot be achieved without the formation of a high contrast exposure image on a photosensitive member. The recent higher speed of rotation of polygon mirror, higher speed of image processing, and simultaneous scanning of a plurality of scan lines have accomplished higher speed and higher resolution of image formation, which is enhancing the resolution of an image. However, the contrast of exposure image which contributes to definition and quality of an image has not been significantly improved since a decrease of a beam diameter is limited due to the restriction of optical system.

In other words, the contract of exposure image can be improved by decreasing a laser beam diameter.

Generally, the decreasing of a laser beam diameter can be achieved, for example, by (1) shortening of laser wavelength, or (2) increasing of incident beam diameter D to an fθ lens, that is, increasing of a diameter of laser beam entering a polygon mirror.

In light beam scanning apparatuses, the above method (1), that is, the shortening of laser wavelength has been achieved by using infrared laser beam, red laser beam, and potentially, blue laser beam. However, under the present conditions, the wavelength of 660 nm of a red laser beam is not sufficiently short relative to the wavelength of 780 nm of an infrared laser beam, and even a blue laser beam has a wavelength of 400 nm which is about one half of that of an infrared laser beam. Meanwhile, the shortening of laser wavelength which is about one half of that of a typical laser beam brings another technical problem such that the focal depth on a photosensitive member surface is also decreased to one half of a typical depth, or the photosensitive member has a lower sensitivity to a shorter wavelength region.

When the above method (2) is applied to a light beam scanning apparatus, a rotating multi-faceted mirror should to have a larger diameter, which brings another problems such as an increased temperature of a motor and undesired noise due to increased windage loss.

As described above, a laser beam diameter could not be decreased in conventional light beam scanning apparatuses.

Then, a method for forming a latent image using multiple exposures has been proposed to solve the above problems.

For example, Japanese Laid-Open Patent Publication (Kokai) No H09-169136 discloses a method for forming an electrostatic latent image including a step of outputting an image signal generated by processing an image signal and inverted image signal generated by inverting the image signal, a step of emitting a first light beam having a predetermined intensity modulated according to the image signal and a second light beam having a intensity lower than that of the predetermined intensity modulated according to the inverted image signal, a step of combining the first light beam and the second light beam to form a combined light beam, and a step of scanning the combined light beam on a photosensitive member to form an electrostatic latent image.

Also, Japanese Laid-Open Patent Publication (Kokai) No. 2002-116395 discloses another method including a step of deflecting a plurality of light fluxes by using deflecting means, and a step of scanning the plurality of light fluxes in series on generally the same region on a scanned surface to provide the scanned surface with multi-valued light quantity.

In the above method using a combined light beam, a higher contrast is obtained by forming an electrostatic latent image on a photosensitive member by multiple exposure so that the image is provided with a sharp edge therearound, but the method has some disadvantages that the position accuracy of the combination of a first light beam and a second light beam cannot be permanently maintained in terms of thermal environment, and that the requirement of two light beams for one scan increases the complexity of configuration of the light beam scanning apparatus in order to correspond to the higher speed of image formation.

The above method using a plurality of light fluxes provides an advantage similar to that when the spot diameter of a light flux is decreased because the dot image which is developed from an electrostatic latent image formed by multiple exposure has a smaller diameter. However, in the method, one position in a main scanning direction is irradiated by different light fluxes, and it is hard to accurately irradiate the one position by the plurality of light fluxes due to optical face tangle errors of a polygon mirror, jitter of the motor for driving the polygon mirror, and misalignment between positions where the light fluxes transmit a lens.

In addition, in conventional light beam scanning apparatuses, the contrast of one dot is often reduced due to the scanning in a main scanning direction.

FIG. 8 is a view showing the construction of a general light beam scanning apparatus in the prior art.

In FIG. 8, an image forming apparatus 600 is configured with: a laser beam source 601 for emitting a laser beam modulated according to an image signal; a collimator lens 602 for converting the diffused light from the laser beam source 601 into a parallel beam; a cylindrical lens 603 for converging the laser beam into a sub scanning direction after the laser beam passes a collimator lens 602; a polygon mirror 605 which is driven to rotate by a motor (not shown); an Fθ lens 606 for collecting the laser beam which is deflected by the polygon mirror 605 and scanning the laser beam on a predetermined main scanning position at a constant speed; and a photosensitive drum 607 onto which an electrostatic latent image is formed by the scanning of the laser beam; and a laser driving circuit 608.

In the image forming apparatus 600, in an image formation at 600 DPI, when an image signal controller (not shown) receives an image signal which corresponds to one dot, the laser driving circuit 608 causes a laser beam to be emitted for about 10nS at a certain rotation number. While the laser beam is emitted, the laser beam scans a surface of a photosensitive drum in a main scanning direction, generally at about 40 μm (for 1 dot). As with the timing of emission, the emission of a laser beam starts 5 nS before the position where a dot is to be formed comes, and finishes 5 nS after the position where the dot is to be formed passes. FIGS. 9A to 9C are views showing an electrostatic latent image formed on a photosensitive drum in the manner described above. FIG. 9A shows spot profiles of an electrostatic latent image formed on a photosensitive drum as seen in the direction perpendicular to the surface of the photosensitive drum; FIG. 9B shows the distribution of light quantity in the spot profile of one dot in FIG. 9A; and FIG. 9C shows the distribution of light quantity in the spot profile of two dots in FIG. 9A. In FIGS. 9A to 9C, the reference numerals 701a and 701b illustrate a case where one dot is formed, while the reference numerals 702a and 702b illustrate a case where two dots are formed with one space being interposed therebetween.

However, when the laser beam produces a dot size of 60μm for example, the laser beam constantly moves at about 40 μm in a main scanning direction during the formation of one dot, resulting in that an electrostatic latent image having a width of 100μm is formed on a photosensitive drum, the image has the maximum light quantity point at its center. When two dots are formed with one space being interposed therebetween, two electrostatic latent images are superimposed at the space part, resulting in a light quantity distribution as shown as 702b of FIG. 9C. This causes a problem of reduced contrast of an electrostatic latent image formed on a photosensitive drum.

SUMMARY OF THE INVENTION

The present invention provides a light beam scanning apparatus which is capable of forming a high contrast electrostatic latent image, and an image forming apparatus provided with the light beam scanning apparatus.

In a first aspect of the present invention, there is provided a light beam scanning apparatus comprising a light source, a first light deflecting unit adapted to scan a light flux emitted from the light source in a main scanning direction, a photosensitive member adapted to form an electrostatic latent image in an irradiation position irradiated by the scanned light flux, a second light deflecting unit that is disposed in a light path between the light source and the first light deflecting unit and is adapted to deflect a course of the light flux emitted from the light source to the main scanning direction by applying a voltage, and a control unit which is electrically connected to the first light deflecting unit and the second light deflecting unit and is adapted to control a voltage to be applied to the second light deflecting unit based on scanning information of the first light deflecting unit, and the control unit maintains the irradiation position on the photosensitive member irradiated by the light flux, by applying a voltage according to the scanning information to the second light deflecting unit during the time period in which an electrostatic latent image corresponding to one dot is formed on the photosensitive member.

In a second aspect of the present invention, there is provided an image forming apparatus comprising a light beam scanning apparatus according to the first aspect of the present invention.

According to the present invention, a second light deflecting unit deflecting the direction of a light flux emitted from a light source to a main scanning direction by applying a voltage is provided in a light path between the light source and a first light deflecting unit, and a control unit maintains an irradiation position on the photosensitive member irradiated by the light flux by applying a voltage according to scanning information to the second light deflecting unit during the time period in which an electrostatic latent image corresponding to one dot is formed on the photosensitive member. This enables a formation of an electrostatic latent image having a size equal to a spot diameter of a light flux on a photosensitive member even when irradiation positions on the photosensitive member are misaligned due to the scanning to the main scanning direction, thereby a high contrast electrostatic latent image can be formed.

Further features and advantages of the present invention will become apparent from the following detailed description of exemplary embodiments with reference to the attached drawings.

BRIEF DESCRIPTION OF THE DRAWINGS

FIG. 5A is a view showing spot profiles of an electrostatic latent image formed on a photosensitive drum using the scanning method explained by FIG. 4, as seen in the direction perpendicular to the surface of a photosensitive drum; FIG. 5B is a view showing a distribution of light quantity in the spot profile of one dot in FIG. 5A; and FIG. 5C is a view showing a distribution of light quantity in the spot profiles of two dots in FIG. 5A. In FIGS. 5A to FIG. 5C, the reference numerals 301a and 301b illustrate a case where one dot is formed, while the reference numerals 302a and 302b illustrate a case where two dots are formed with one space being interposed therebetween.

As shown in FIGS. 5A to 5C, in either case where one dot is formed or two dots are formed with one space being interposed therebetween, the electrostatic latent image which is to be formed on the photosensitive drum 7 is positioned as a stationary spot, which allows the electrostatic latent image to have a diameter which is almost equal to the spot diameter of the light flux. As a result, a high contrast electrostatic latent image with concentrated exposure can be formed on the photosensitive drum 7.

FIG. 9A is a view showing spot profiles of an electrostatic latent image formed on a photosensitive drum using the conventional light beam scanning apparatus, as seen in the direction perpendicular to the surface of a photosensitive drum; FIG. 9B is a view showing a distribution of light quantity in the spot profile of one dot in FIG. 9A; and FIG. 9C is a view showing a distribution of light quantity in the spot profile of the two dots in FIG. 9A.

DETAILED DESCRIPTION OF THE PREFERRED EMBODIMENTS

Embodiments of the present invention will be described in detail with reference to drawings showing preferred embodiments thereof.

<First Example of Structure of Light Beam Scanning Apparatus According to the Present Embodiment>

Figure 1:
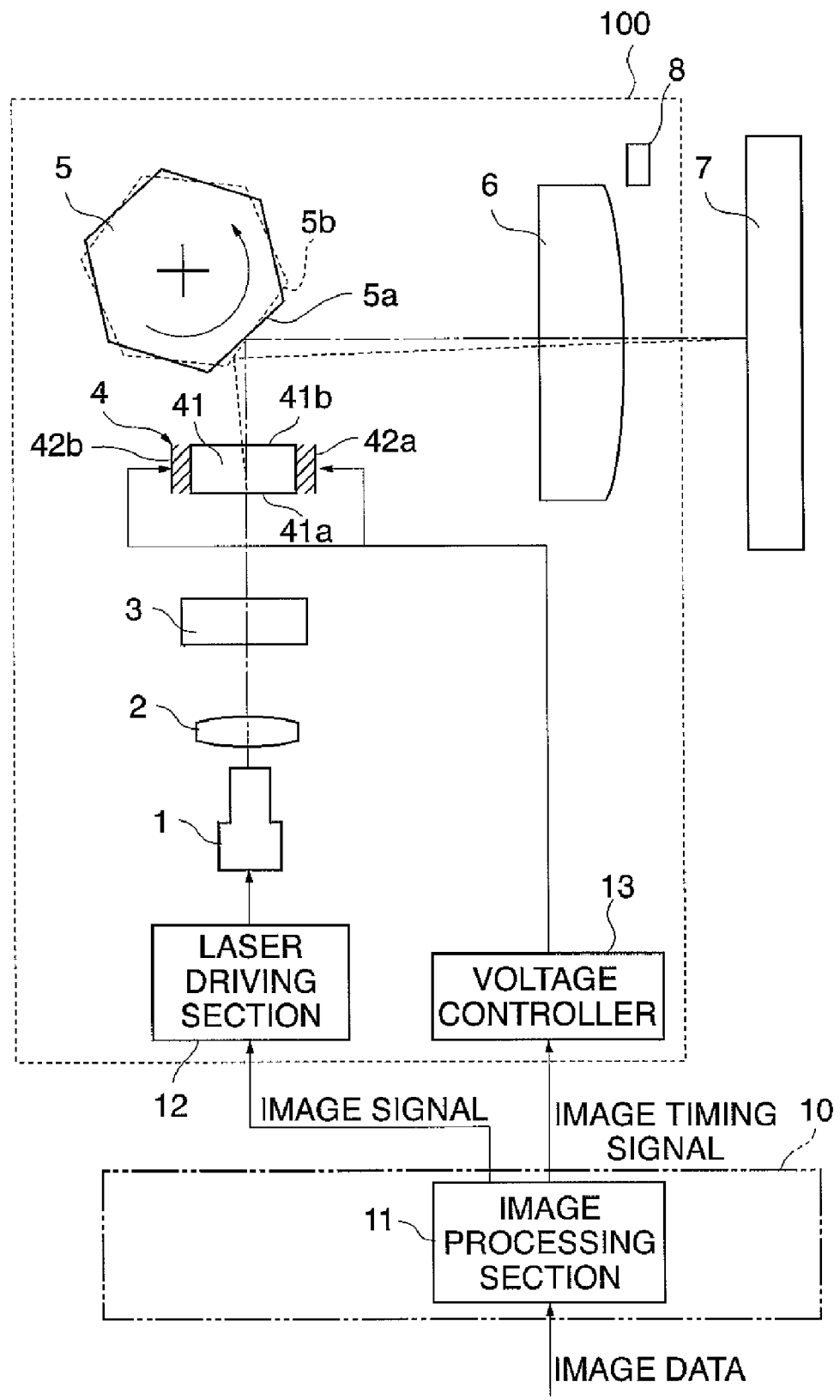
FIG. 1 is a plan view schematically showing the construction of a light beam scanning apparatus according to an embodiment of the present invention.

FIG. 1 is a plan view schematically showing the construction of a light beam scanning apparatus according to an embodiment of the present invention.

In FIG. 1, a light beam scanning apparatus 100 is comprised of: a laser beam source (laser diode) 1; a collimator lens 2 for converting a light flux (laser beam) emitted from the laser beam source 1 into a generally parallel light flux; a cylindrical lens 3 for changing the direction of the generally parallel light flux converted by the collimator lens 2 to a sub scanning direction, and causing the light flux to enter an electro-optic crystal 41 described hereinafter; a polygon mirror 5 for scanning the light flux; an electro-optic crystal structure 4, which is disposed in a light path between the cylindrical lens 3 and the polygon mirror 5 (rotating member), for deflecting the light flux emitted from the laser beam source 1 by applying a voltage to; an fθ lens 6 for forming an image of the light flux scanned by the polygon mirror 5 on a photosensitive drum 7; and a controller 10 which is electrically connected to the laser beam source 1 and the electro-optic crystal structure 4 and totally controls the light beam scanning apparatus 1.

A BD sensor 8 detects a horizontal synchronizing (BD) signal as a write reference in a main scanning direction of the photosensitive drum 7. The light flux for writing prior to the image area enters the BD sensor 8.

The light beam scanning apparatus 100 is further comprising: a laser driving section 12 for ON/OFF control of the laser beam source 1, based on the signal from a image processing section 11 which receives an image signal from an image forming apparatus 200 to which the light beam scanning apparatus 100 is provided or an external apparatus; and an EO crystal voltage controller 13 for controlling a voltage to be applied to the electro-optic crystal structure 4.

The electro-optic crystal structure 4 leads the light flux to the polygon mirror 5 using high speed and wide angle electro-optic effect described hereinafter.

The EO crystal voltage controller 13 controls a voltage to be applied to the electro-optic crystal structure 4 based on a recording density (DPI) and/or a rotation number of the polygon mirror 5.

In the light beam scanning apparatus 100 configured as described above, upon a receipt of image data from an image forming apparatus or the like, the image processing section 11 sends an image signal to the laser driving section 12, and also sends an image timing signal to the EO crystal voltage controller 13.

For example, in an image formation at a recording density of 600 DPI, when the image processing section 11 receives an image signal which corresponds to one dot, the laser driving section 12 causes a light flux to be emitted for about 10 nS at a certain rotation number. While the light flux is emitted, the light flux scanned by the polygon mirror 5 is converted by the Fθ lens 6 to have a constant speed, so that the light flux scans the photosensitive drum 7 in a main scanning direction for about 40 μm (for 1 dot). Meanwhile, the EO crystal voltage controller 13, upon a receipt of the image timing signal, applies a predetermined voltage according to a rotation number of the polygon mirror 5 to the electro-optic crystal structure 4. The application of the predetermined voltage to the electro-optic crystal structure 4 generates an electric field in response to the applied voltage along the main scanning direction in an EO crystal 41. The light flux emitted from the laser beam source 1 passes the collimator lens 2, the cylindrical lens 3, and the EO crystal 41 where the light flux is deflected into the main scanning direction (the direction to the electric field).

<Example of Structure of Electro-Optic Crystal Structure 4>

Figure 2:
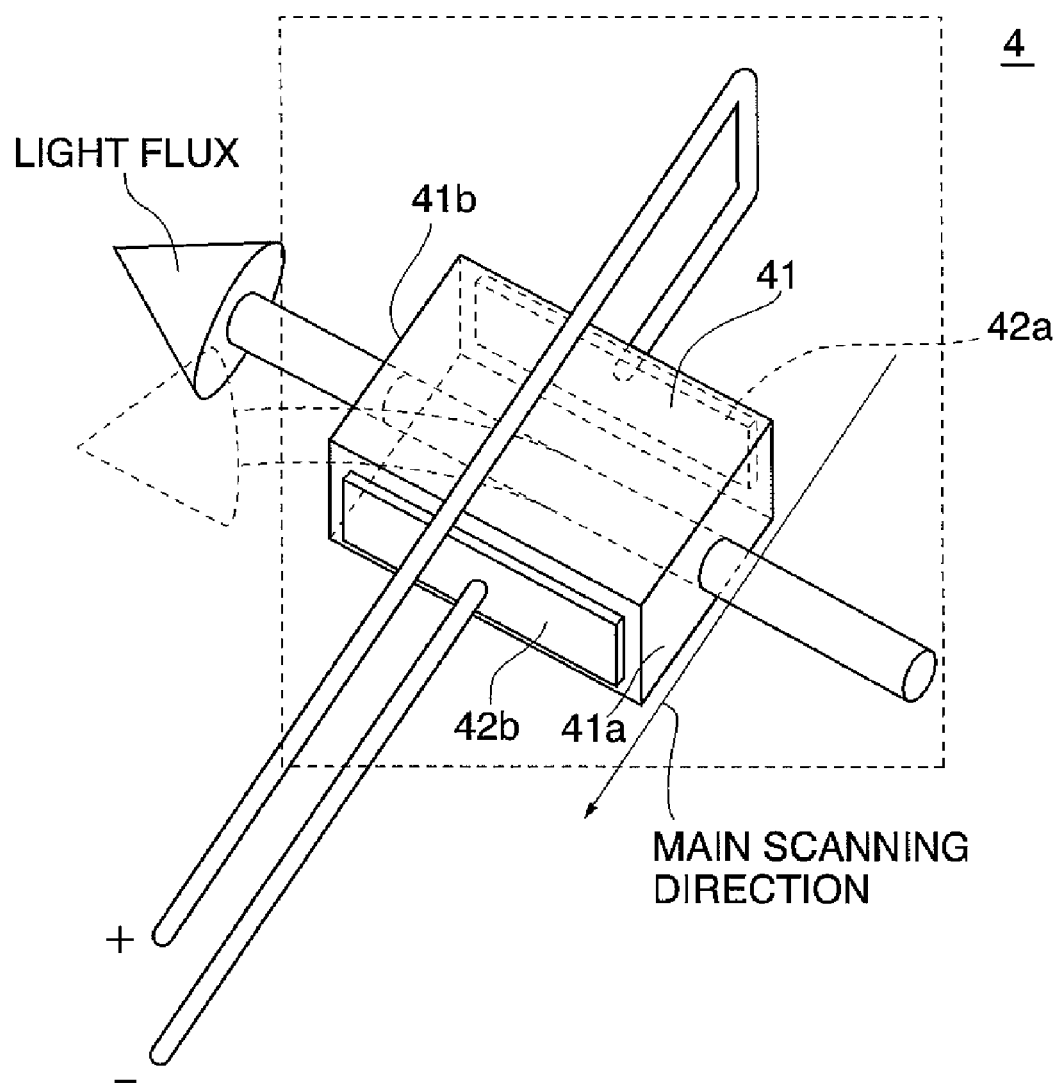
FIG. 2 is a perspective view schematically showing the construction of an electro-optic crystal structure of FIG. 1.

FIG. 2 is a perspective view schematically showing the construction of an electro-optic crystal structure 4 of FIG. 1.

As shown in FIG. 2, the electro-optic crystal structure 4 includes the electro-optic crystal (hereinafter, referred to as "EO" crystal) 41 of a rectangular shape having an entrance surface 41a and an exit surface 41b. The electro-optic crystal structure 4 further includes a pair of electrodes 42a, 42b mounted to the end surfaces perpendicular to the main scanning direction, and a power source (not shown) for applying a voltage between the pair of electrodes 42a, 42b. The electrodes 42a, 42b are individually formed in an elongated electrode of a linear strip shape having a width d and a length L. The electrodes 42a, 42b are made of Au for example, but may be made of any other conductive material. The electrodes 42a, 42b are manufactured by vacuum deposition processes.

The pair of electrodes 42a, 42b form an electric field in the EO crystal 41 in a direction perpendicular to the course of the light flux which passes through the EO crystal 41 (the main scanning direction of FIG. 2).

While no voltage is applied to the electrodes 42a, 42b yet, the EO crystal 41 does not function as a lens, and the incident beam passes through the EO crystal 41 straight to the polygon mirror 5.

When a voltage of up to 5 to 10 kV is applied to the pair of electrodes 42a, 42b to generate an electric field in the electro-optic crystal 21, a distribution of an electric field is produced so that the light flux is deflected by more than ten degrees, for example twelve degrees, in a period of time in ms or ns. The electro-optic crystal structure 4 uses the high speed and wide angle electro-optic effect to deflect the light flux.

The term electro-optic crystal as used herein means the crystal having characteristics in which a refractive index thereof is changed by an application of a voltage. The EO crystal 41 is formed of an electro-optic crystal such as a KTN ($KTaNbO_3$: potassium tantalite niobate, $KTa_{1-x}Nb_xO_3$) crystal composed of potassium, tantalum, niobium, and oxygen. The KTN crystal can be treated in a manner similar to typical optical glass, and has excellent processability which easily ensures surface accuracy in cutting and abrasive machining. As to light transmittance, the KTN crystal exhibits an internal transmittance of 95% or more per 1.0 m for a laser having a wavelength over the entire range from infrared to visible light, and also has a low birefringence. In addition, the KTN crystal has a water absorption rate less than that of typical glass, and the rate is extremely low to resin.

The KTN crystal is known by its refractive index which changes when an electric field is generated in the KTN crystal. It has been found that, when electrodes are provided at both ends of the KTN crystal to generate an electric field therein (by applying a voltage=V to one end, and no voltage=0 to the other end), the electric field is distributed in the KTN crystal in an inclined manner to which the refractive index is proportional to be distributed in an inclined manner, thereby a light changes the direction of its course in the KTN crystal. The KTN crystal is characterized by enabling a high speed and wide angle scanning.

In the EO crystal 41, the light flux which passes through the EO crystal 41 is deflected by changing the direction of its course toward the electric field depending on the increased voltage applied to the both ends of the EO crystal 41.

The present invention utilizes the above phenomenon to cause the direction of a laser beam to be changed when the beam passes through an EO crystal.

<Example of Structure of Image Forming Apparatus Having Light Beam Scanning Apparatus>

Figure 3:
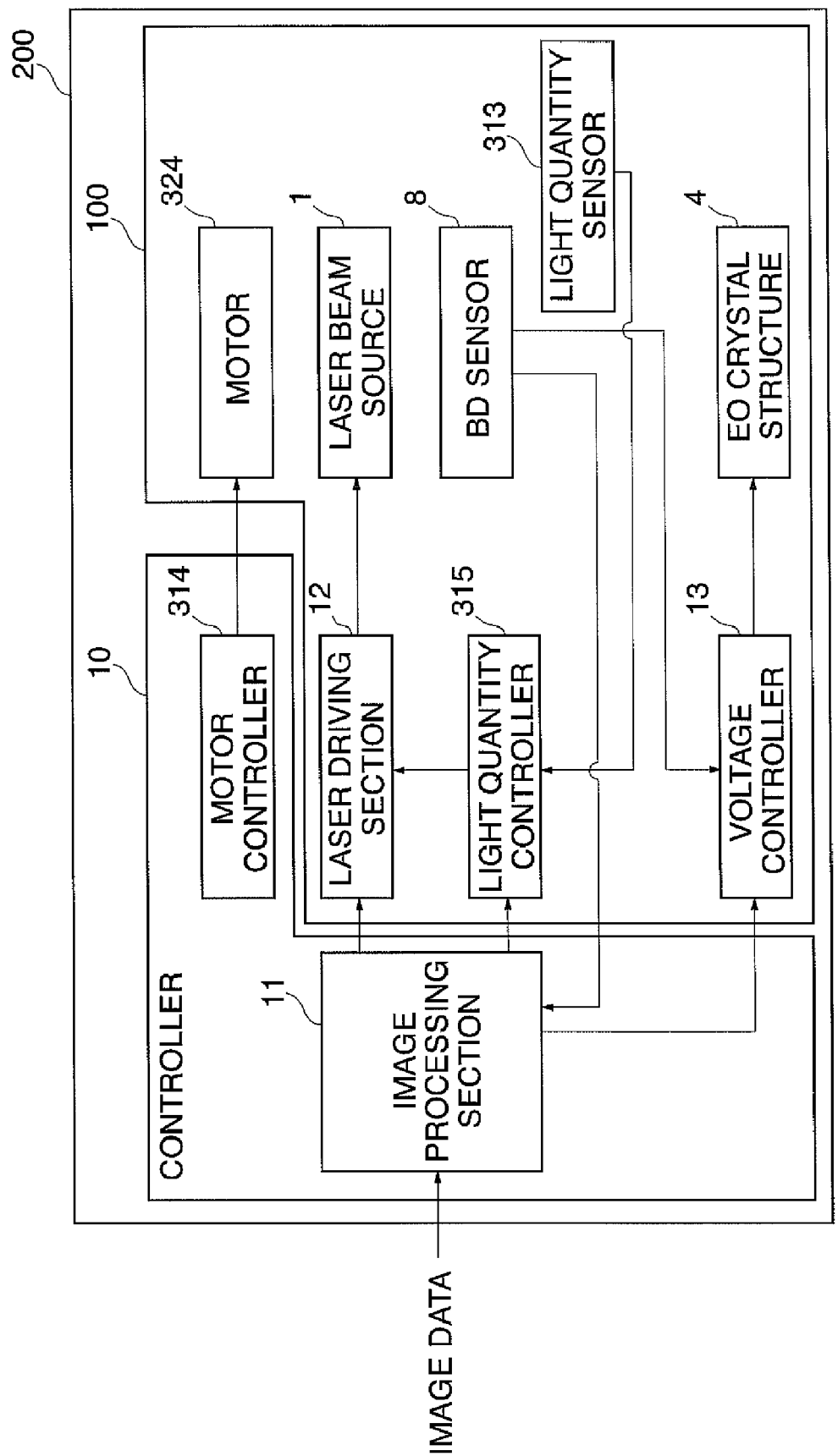
FIG. 3 is a block diagram schematically showing the construction of an image forming apparatus having the light beam scanning apparatus of FIG. 1.

FIG. 3 is a block diagram schematically showing the construction of an image forming apparatus having the light beam scanning apparatus of FIG. 1.

In FIG. 3, an image a controller 10 includes the image processing section 11 and a motor controller 314 for controlling a motor 324 which drives and rotates the polygon mirror 5. The light beam scanning apparatus 100 includes: a laser beam source 1; a light quantity sensor 313 for detecting a light quantity of the laser beam source 1; a BD sensor 8; a laser driving section 12; a light amount controller 315; a EO crystal voltage controller 13; the motor 324 for driving and rotating the polygon mirror 5; and an electro-optic (EO) crystal structure 4.

The image processing section 11 outputs an instruction for controlling a light quantity at a non-image area to the light quantity controller 315, based on a BD signal obtained from the BD sensor 8. The light quantity controller 315, upon the receipt of the instruction from the image processing section 11, causes the laser beam source 1 to emit a light. The light quantity controller 315 controls so that the light flux emitted from the laser beam source 1 has a predetermined light quantity while repeating the comparison between the detected light quantity by the light quantity sensor 313 and the light quantity corresponding to a reference voltage (hereinafter, referred to as APC). When the detected light quantity becomes equal to the predetermined value, the image processing section 11 outputs a video signal for controlling ON/OFF of the light flux based on the input image data from the exterior to the laser driving section 12.

The present invention relates to a construction and control for detecting a light quantity using a light quantity sensor, and does not relates to a detail control of APC, which will not be explained in detail below.

The EO crystal voltage controller 13 sends an instruction for applying a voltage to the EO crystal 41, based on a BD signal obtained from the BD sensor 11. The EO crystal 41 after the application of a voltage uses the high speed and wide angle electro-optic effect to cause the light flux to be deflected. Furthermore, the EO crystal voltage controller 13 sends an instruction for stopping the application of a voltage to the EO crystal 41 at the timing of APC completion. This eliminates the lens function of the EO crystal 41 so that the incident beam passes through the EO crystal 41 straight to the polygon mirror 5.

<Example of Operation of Light Beam Scanning Apparatus of the Present Embodiment>

Figure 4:
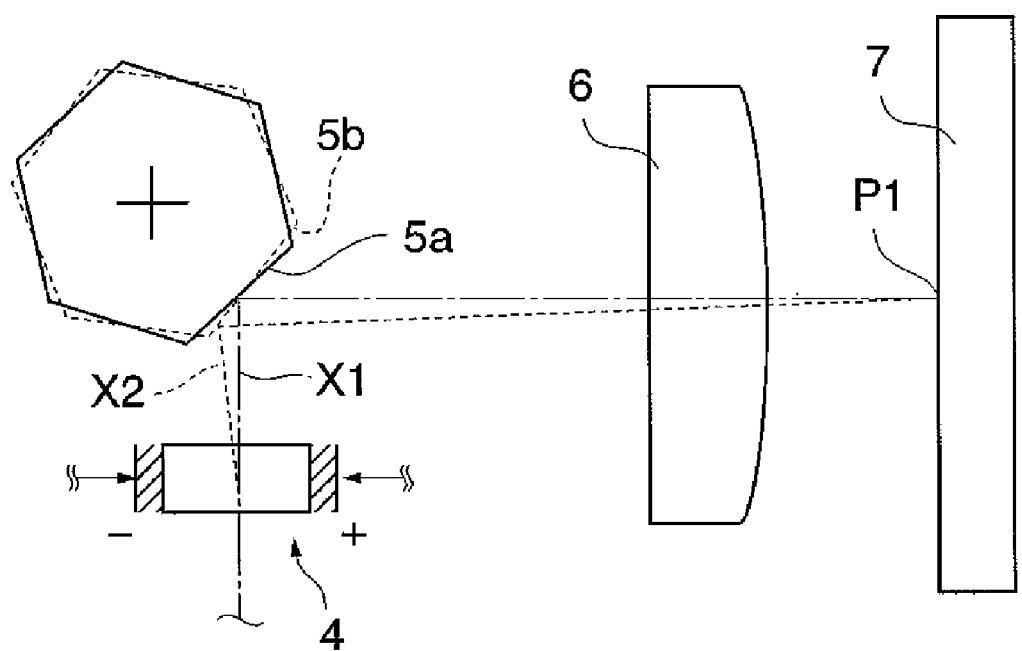
FIG. 4 is a view illustrating a scan control method implemented by a controller of FIG. 1.

FIG. 4 is a view illustrating a scan control method implemented by the controller 10 of FIG. 1.

A user presses a copy button on an operating section, or a print instruction sent from an external device such as a PC is received. Then, the polygon mirror 5 is in a state to rotate at a constant speed, the laser beam source 1 is caused to emit a light flux as a reference to control a light emission timing in the main scanning direction, so that the BD sensor 8 detects a BD signal. Next, an image is written when the predetermined timing period has elapsed from the detection of the BD signal. The following control is repeated per every pixel to form an image. Here, one operation for one pixel will be focused and described below.

First, no voltage is applied to the EO crystal 41 so as to cause the light flux emitted from the laser diode 1 to pass straight to the polygon mirror 5.

In FIG. 4, when the polygon mirror 5 rotates in a clockwise direction (the direction shown by the arrow in FIG. 4), a reflecting surface of the polygon mirror 5 rotates from a reflecting position 5a to another reflecting position 5b during 10 nS in which one dot is formed. Because no voltage is applied to the EO crystal 41, at the time when one dot is generated, the light flux is reflected at the reflecting position 5a of the polygon mirror 5 to irradiate a point P1 on the photosensitive drum 7 (as shown by a light path X1 in FIG. 4).

Next, a predetermined voltage is applied between the pair of electrodes 42a, 42b of the electro-optic crystal structure 4. This causes a voltage to be applied to the EO crystal 41. An electric field is generated in the EO crystal 41 under control to cause the light flux to be deflected by about 12 degrees toward the main scanning direction. As a result, when one dot is formed, the light flux is deflected to a opposite direction relative to the rotational direction of the reflecting surface of the polygon mirror 5 by the predetermined voltage applied by the electro-optic crystal structure 4, and then reflected at the reflecting position 5b of the polygon mirror 5 to irradiate the point P1 on the photosensitive drum 7 (as shown by a light path X2 in FIG. 4). That is, during 10 nS in which one dot is formed, the course of the light flux is changed from the light path X1 to the light path X2 so that the irradiation position (P1) on the photosensitive drum 7 is maintained. Then, the application of a voltage to the EO crystal 21 is stopped. The above described operation is repeated for every pixel. For each scanning line, it is determined whether or not a scanning of image data for the scanning line is completed, and if not, the above described operation is repeated. When the scanning of the entire image data for one page is completed, the process is terminated.

Only the start and end point of time for formation of one dot was described above. Actually, during the time period in which one dot is formed, a voltage applied to the electro-optic crystal structure 4 is continuously controlled and the light flux is conveniently deflected to the main scanning direction in response to the reflecting position of the polygon mirror 5, so that all of the emitted light fluxes during the time period for one dot formation irradiate the point P1 on the photosensitive drum 7. As a result, during the time period for one dot formation, the light fluxes irradiate the point P1 on the photosensitive drum 7 as a stationary light.

FIG. 5A is a view showing spot profiles of an electrostatic latent image formed on a photosensitive drum using the scanning method explained by FIG. 4, as seen in the direction perpendicular to the surface of a photosensitive drum; FIG. 5B is a view showing a distribution of light quantity in the spot profile of one dot in FIG. 5A; and FIG. 5C is a view showing a distribution of light quantity in the spot profiles of two dots in FIG. 5A. In FIG. 5A to FIG. 5C, the reference numerals 301a and 301b illustrate a case where one dot is formed, while the reference numerals 302a and 302b illustrate a case where two dots are formed with one space being interposed therebetween.

As shown in FIGS. 5A to 5C, in either case where one dot is formed or two dots are formed with one space being interposed therebetween, the electrostatic latent image which is to be formed on the photosensitive drum 7 is positioned as a stationary spot, which allows the electrostatic latent image to have a diameter which is almost equal to the spot diameter of the light flux. As a result, a high contrast electrostatic latent image with concentrated exposure can be formed on the photosensitive drum 7.

According to the present embodiment, in the light path between the cylindrical lens 3 and the polygon mirror 5, the electro-optic crystal structure 4 is provided for deflecting the course of the light flux emitted from the laser beam source toward the main scanning direction by applying a voltage, and the EO crystal voltage controller 13 maintains the irradiation position on the photosensitive drum 7 irradiated by the light flux by applying a predetermined voltage to the electro-optic crystal structure 4 according to a rotation number of the polygon mirror 5 during the time period in which the electrostatic latent image corresponding to one dot is formed on the photosensitive drum 7. This enables a formation of an electrostatic latent image having a size equal to a spot diameter of a light flux on a photosensitive drum 7 even when irradiation positions on the photosensitive drum 7 are misaligned due to the scanning to the main scanning direction, thereby a high contrast electrostatic latent image can be formed.

The polygon mirror 5 is configured as a rotational member which is provided with reflecting surfaces for reflecting the light flux emitted from the laser beam source 1, and the EO crystal voltage controller 13 controls a voltage which is applied to the electro-optic crystal structure 4 based on a rotation number of the polygon mirror 5, thereby an irradiation position on the photosensitive drum 7 relative to the main scanning direction can be securely maintained.

Moreover, the electro-optic crystal structure 4 causes the light flux emitted from the laser beam source 1 to be deflected to the opposite direction relative to the rotational direction of the reflecting surface of the polygon mirror 5, thereby an irradiation position on the photosensitive drum 7 relative to the main scanning direction can be more securely maintained.

In the present embodiment, the cases where one dot is formed or two dots are formed with one space being interposed therebetween have been explained, but in the case where dots in series are formed, a high contrast electrostatic latent image with concentrated exposure can be formed on the photosensitive drum 7 by repeatedly implementing the similar sequence.

Figure 6A:
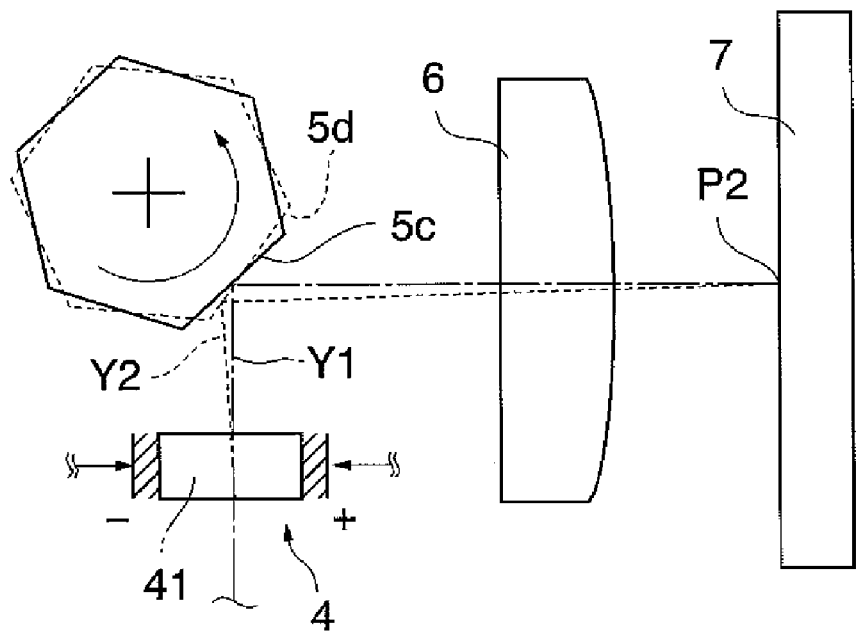
FIG. 6A and FIG. 6B are views illustrating another scan control method which is implemented by a controller of FIG. 1 when an electrostatic latent image is formed corresponding to dots in series.
Figure 6B:
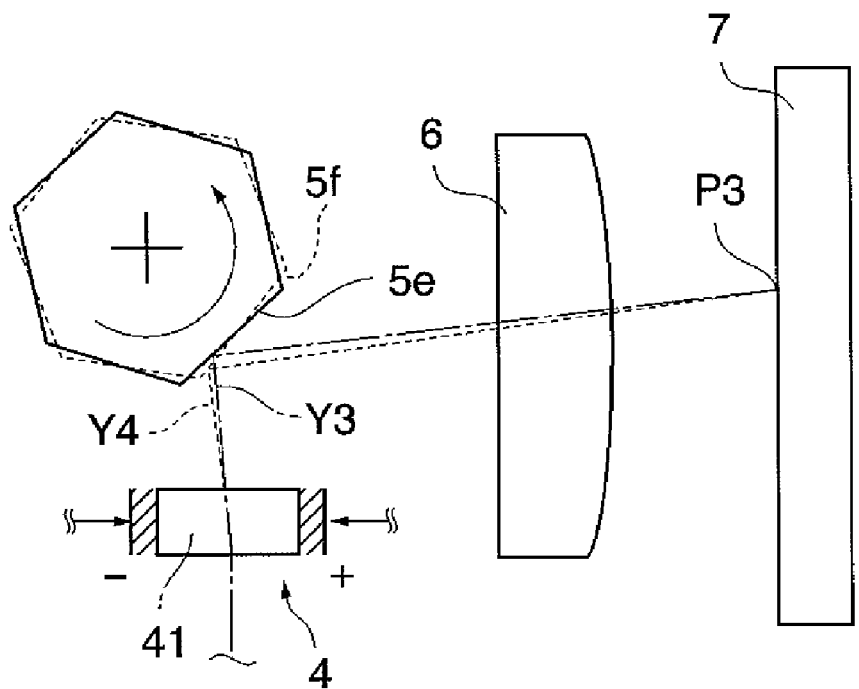

FIG. 6A and FIG. 6B are views illustrating another scan control method which is implemented by the controller 10 in FIG. 1 to form an electrostatic latent image corresponding to dots in series.

In FIG. 6A and FIG. 6B, when the polygon mirror 5 rotates in a clockwise direction (the direction shown by the arrow in FIG. 6A), a reflecting surface of the polygon mirror 5 rotates from a reflecting position 5c to another reflecting position 5d during 5 nS which is one half of the time for forming the first one dot (10 nS) out of the dots in series. At the time when the first one dot is generated, the light flux is reflected at the reflecting position 5c of the polygon mirror 5 to irradiate a point P2 on the photosensitive drum 7 (as shown by a light path Y1 in FIG. 6A). During the 5 nS from the time point for the formation of the first dot, a predetermined voltage V1 according to a rotation number of the polygon mirror 5 is applied to the electro-optic crystal structure 4. As a result, the light flux is deflected to an opposite direction relative to the rotational direction of the reflecting surface of the polygon mirror 5, and then reflected at the reflecting position 5d of the polygon mirror 5 to irradiate the point P2 on the photosensitive drum 7 (as shown by a light path Y2 in FIG. 6A). That is, during the 5 nS from the time point for the formation of the first dot, the application of the predetermined voltage V1 to the EO crystal 41 causes the course of the light flux to be changed from the light path Y1 to the light path Y2 so that the irradiation position (P2) on the photosensitive drum 7 is maintained.

After that, while the light fluxes are serially emitted corresponding to the dots in series, the voltage applied to the electro-optic crystal structure 4 is maintained to be the predetermined voltage V1 which is applied when 5 nS has passed after the first one dot was formed.

The light flux which is emitted at the time point when the last one dot is formed out of the dots in series is reflected at the reflecting position 5e of the polygon mirror 5 to irradiate the point P3 on the photosensitive drum 7 (as shown by a light path Y3 in FIG. 6B). The reflecting surface of the polygon mirror 5 rotates from the reflecting position 5e to another reflecting position 5f during 5 nS which is the other half of the time for forming the last one dot (10 nS). During the 5 nS from the time point for the formation of the last one dot, a predetermined voltage V2 according to a rotation number of the polygon mirror 5 is applied to the electro-optic crystal structure 4. In the present embodiment, there is a relationship: V1<V2 between the predetermined voltage V1 and the predetermined voltage V2. This causes the light flux to be deflected to the opposite direction relative to the rotational direction of the reflecting surface of the polygon mirror 5, and reflected at the reflecting position 5f of the polygon mirror 5 to irradiate the point P3 on the photosensitive drum 7 (as shown by a light path Y3 in FIG. 6B). The voltage applied to the electro-optic crystal structure 4 is continuously increased from the predetermined voltage V1 to the predetermined voltage V2 during the time from 5 nS to 10 nS after the formation of the last one dot starts. This causes the light flux to be deflected to the opposite direction relative to the rotational direction of the reflecting surface of the polygon mirror 5, and reflected at the reflecting position 5f of the polygon mirror 5 to irradiate the point P3 on the photosensitive drum 7 (as shown by a light path Y4 in FIG. 6B). That is, during the time from 5 nS to 10 nS after the formation of the last one dot starts, the application of the predetermined voltage V2 to the EO crystal 41 causes the course of the light flux to be changed from the light path Y3 to the light path Y4 so that the irradiation position on the photosensitive drum 7 is maintained.

According to the above described scan control method, when an electrostatic latent image corresponding to dots in series is formed on the photosensitive drum 7, during the time after the formation of the first one dot starts until 5 nS passes, the predetermined voltage V1 according to a rotation number of the polygon mirror 5 is applied to the electro-optic crystal structure 4, and then, during the time from 5 nS to 10 nS after the formation of the last one dot out of the dots in series starts, the predetermined voltage V2 according to a rotation number of the polygon mirror 5 is applied to the electro-optic crystal structure 4, which provides an electrostatic latent image having a high contrast edge therearound corresponding to the dots in series.

Figure 7A:
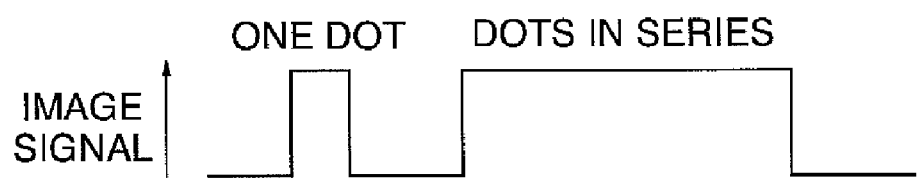
FIG. 7A is a view showing a timing chart of an image signal corresponding to each dot when one dot is formed and when dots are formed in series respectively.
Figure 7B:
FIG. 7B is a view showing a timing chart of an applied voltage in the scan control method of FIG. 4.

FIG. 7A is a view showing a timing chart of an image signal corresponding to each dot when one dot is formed and when dots are formed in series respectively; FIG. 7B is a view showing a timing chart of an applied voltage in the scan control method of FIG. 4; and FIG. 7C is a view showing a timing chart of an applied voltage in the scan control method of FIG. 6A and FIG. 6B.

Figure 7C:
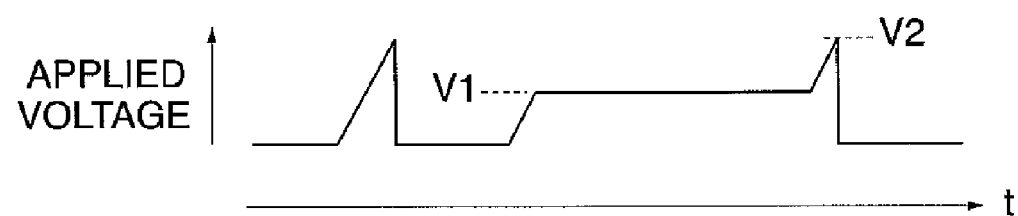
FIG. 7C is a view showing a timing chart of an applied voltage in the scan control method of FIG. 6A and FIG. 6B.
Figure 8:
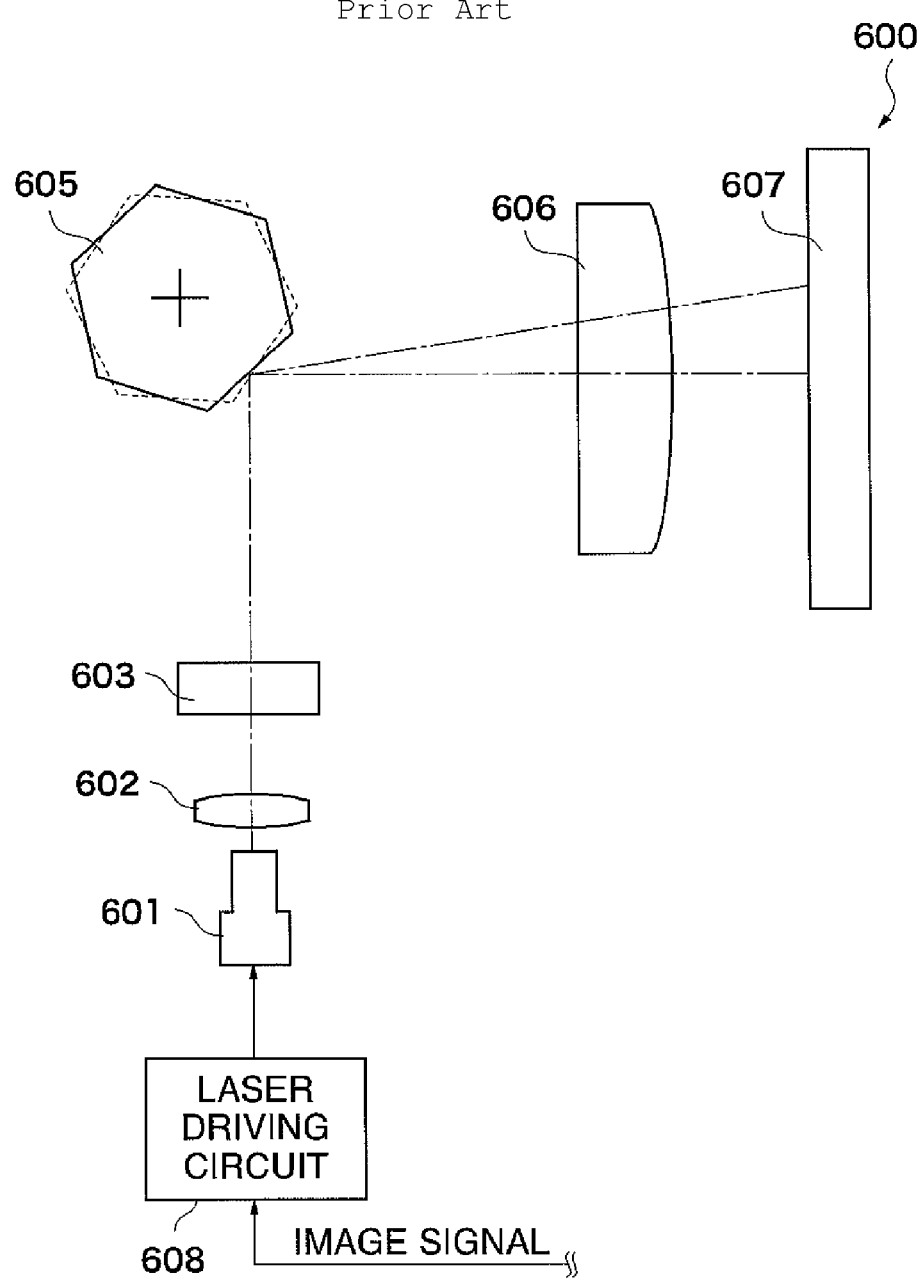
FIG. 8 is a view showing a structure of a general light beam scanning apparatus in the prior art.

As shown in FIG. 7A to FIG. 7C, in forming one dot, the EO crystal voltage controller 13 applies the same voltage to the electro-optic crystal structure 4 in either of the scan control method shown in FIG. 4 and the scan control method shown in FIG. 6A and FIG. 6B. To the contrary, in forming dots in series, in the scan control method shown in FIG. 6A and FIG. 6B, during the time after the formation of the first one dot starts until 5 nS passes and during the time from 5 nS to 10 nS after the formation of the last one dot starts, the voltage applied to the electro-optic crystal structure 4 is continuously increased so that an electrostatic latent image having a high contrast edge therearound corresponding to the dots in series can be obtained. Also in the scan control method shown in FIG. 6A and FIG. 6B, a control frequency of the electro-optic crystal structure 4 can be totally reduced as compared to that in the scan control method shown in FIG. 4, which restrains the generation of high frequency noise.

In the present embodiment, the electro-optic crystal structure 4 is provided in a light path between the cylindrical lens 3 and the polygon mirror 5, but the present invention is not limited thereto, and the electro-optic crystal structure 4 may be provided in light path between the laser beam source 1 and the polygon mirror 5.

In the present embodiment, the polygon mirror 5 is used to scan the photosensitive drum 8, but the present invention is not limited thereto, and the present invention may be configured to use a galvanometer mirror or MEMS (Micro Electro Mechanical System) to scan photosensitive drum.

It is to be understood that the object of the present invention may be also accomplished by supplying a light beam scanning apparatus with a storage medium in which a software program which realizes the functions of the above described embodiment is stored, and causing a computer (or CPU or MPU) of the light beam scanning apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include an optical disk such as a floppy disk, a hard disk, a magnetic optical disk, a CD-ROM, a CD-R, a CD-RW, a DVD-ROM, a DVD-RAM, a DVD-RW, and a DVD+RW, a magnetic tape, a non-volatile memory card, or a ROM. Alternatively, the program code may be downloaded via a network.

Needless to say, it is to be understood that the function of the above described embodiment may be accomplished not only by executing a program code read out by a computer, but also by causing the OS (operation system) or the like running on the computer to perform a part or all of the actual processing based on instructions of the program code.

Furthermore, it is to be understood that the function of the above described embodiment may be accomplished by writing a program code read out from the storage medium into a memory provided on an expansion board inserted into a computer or an expansion unit connected to the computer, and then causing a CPU or the like provided in the expansion board or the expansion unit to performs a part or all of the actual processing based on instructions of the program code.

While the present invention has been described with reference to exemplary embodiments, it is to be understood that the invention is not limited expansion unit connected to the computer, and then causing a CPU or the like provided in the expansion board or the expansion unit to performs a part or all of the actual processing based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-350149, filed Dec. 26, 2006, and Japanese Patent Application No. 2007-325452, filed Dec. 18, 2007, which are hereby incorporated by reference herein in its entirety.

What is claimed is:

1. A light beam scanning apparatus comprising:
a light source;
a first light deflecting unit configured to deflect a light flux from said light source so that the light flux scans on a photosensitive member to form an electrostatic latent image in an irradiation position of the light flux on the photosensitive member;
a second light deflecting unit configured to deflect the light flux to adjust the irradiation position of the light flux on the photosensitive member with respect to a scanning direction in which the light flux is to be scanned by said first light deflecting unit, said second light deflecting unit deflecting the light flux when a voltage is applied thereto;
a voltage applying unit configured to apply the voltage to said second light deflecting unit; and
a control unit configured to control the voltage to be applied to said second light deflecting unit by said voltage applying unit,
wherein said control unit is configured to control the voltage so that a dot diameter of the electrostatic latent image for one dot to be formed on the photosensitive member is substantially same in size as a spot diameter of the light flux to be irradiated on the photosensitive member for producing the electrostatic latent image for one dot,
wherein said first light deflecting unit has a rotating member which is provided with a reflecting surface for reflecting the light flux emitted from said light source, and said control unit is configured to control a voltage to be applied to said second light deflecting unit, based on a rotation number of said rotational member, and
wherein in forming an electrostatic latent image corresponding to dots in series on said photosensitive member, said control unit is configured to apply a first applying voltage according to the rotation number of said rotational member to said second light deflecting unit during the time after the formation of the first one dot starts until a predetermined time passes, and is configured to apply a second applying voltage according to the rotation number of said rotational member to said second light deflecting unit during the time after the formation of the last one dot out of the dots in series starts until a predetermined time passes.

2. A light beam scanning apparatus as claimed in claim 1, wherein said second light deflecting unit is configured to deflect the light flux emitted from said light source to the opposite direction relative to the rotational direction of said reflecting surface.

3. A light beam scanning apparatus as claimed in claim 1, wherein said second light deflecting unit includes an electro-optic crystal having characteristics in which a refractive index thereof is changed by an application of a voltage, and said electro-optic crystal is composed of potassium, tantalum, niobium, and oxygen.

4. A light beam scanning apparatus as claimed in claim 1, wherein said second light deflecting unit is disposed in a light path between said light source and said first light deflecting unit.

5. A light beam scanning apparatus as claimed in claim 1, wherein said control unit is configured to control said voltage applying unit so that the voltage is applied in accordance with the rotation number of said rotational member during a time period in which the electrostatic latent image for one dot is formed on said photosensitive member.

6. A light beam scanning apparatus as claimed in claim 1,
wherein said first light deflecting unit is a rotating polygon mirror;
wherein said voltage applying unit is configured to apply the voltage to said second light deflecting unit so as to produce a potential difference in a direction perpendicular to both of a rotational axis of the rotating polygon mirror and a course of the light flux which passes through said second light deflecting unit.

7. An image forming apparatus comprising:
a photosensitive member; and
a light beam scanning unit configured to form an electrostatic latent image on said photosensitive member, wherein said light beam scanning unit comprises:
a light source;
a first light deflecting unit configured to deflect a light flux from said light source so that the light flux scans on said photosensitive member to form the electrostatic latent image in an irradiation position of the light flux on said photosensitive member;
a second light deflecting unit configured to deflect the light flux to adjust the irradiation position of the light flux on said photosensitive member with respect to a scanning direction in which the light flux is to be scanned by said first light deflecting unit, said second light deflecting unit deflecting the light flux when a voltage is applied thereto;
a voltage applying unit configured to apply the voltage to said second light deflecting unit; and
a control unit configured to control the voltage to be applied to said second light deflecting unit by said voltage applying unit,
wherein said control unit is configured to control the voltage so that a dot diameter of the electrostatic latent image for one dot to be formed on said photosensitive member is substantially same in size as a spot diameter of the light flux, to be irradiated on said photosensitive member for producing the electrostatic latent image for one dot,
wherein said first light deflecting unit has a rotating member which is provided with a reflecting surface for reflecting the light flux emitted from said light source, and said control unit is configured to control a voltage to be applied to said second light deflecting unit, based on a rotation number of said rotational member, and
wherein in forming an electrostatic latent image corresponding to dots in series on said photosensitive member, said control unit is configured to apply a first applying voltage according to the rotation number of said rotational member to said second light deflecting unit during the time after the formation of the first one dot starts until a predetermined time passes, and is configured to apply a second applying voltage according to the rotation number of said rotational member to said second light deflecting unit during the time after the formation of the last one dot out of the dots in series starts until a predetermined time passes.

8. An image forming apparatus as claimed in claim 7, wherein said second light deflecting unit is configured to deflect the light flux emitted from said light source to the opposite direction relative to the rotational direction of said reflecting surface.

9. An image forming apparatus as claimed in claim 7, wherein said second light deflecting unit includes an electro-optic crystal having characteristics in which a refractive index thereof is changed by an application of a voltage, and said electro-optic crystal is composed of potassium, tantalum, niobium, and oxygen.

10. An image forming apparatus as claimed in claim 7, wherein said second light deflecting unit is disposed in a light path between said light source and said first light deflecting unit.

11. An image forming apparatus as claimed in claim 7, wherein said control unit is configured to control said voltage applying unit so that the voltage is applied in accordance with the rotation number of said rotational member during a time period in which the electrostatic latent image for one dot is formed on said photosensitive member.

12. An image forming apparatus as claimed in claim 7,
wherein said first light deflecting unit is a rotating polygon mirror;
wherein said voltage applying unit is configured to apply the voltage to said second light deflecting unit so as to produce a potential difference in a direction perpendicular to both of a rotational axis of the rotating polygon mirror and a course of the light flux which passes through said second light deflecting unit.

* * * * *